United States Patent Office
3,159,594
Patented Dec. 1, 1964

3,159,594
WATER-SOLUBLE SULFUR AND NITROGEN CONTAINING DERIVATIVES OF UNSATURATED ALDEHYDE POLYMERS, THEIR PREPARATION AND USE
Elliot Bergman, Berkeley, Calif., assignor to Shell Oil Company, New York, N.Y., a corporation of Delaware
No Drawing. Filed May 23, 1960, Ser. No. 30,768
17 Claims. (Cl. 260—29.6)

This invention relates to new polymeric materials and to their prepartion. More particularly, the invention relates to new water-soluble nitrogen and sulfur-containing polymeric materials, to their preparation from polymers of unsaturated aldehydes, and to the use of the new products, particularly for the treatment of fibrous materials.

Specifically, the invention provides new and particularly useful water-soluble nitrogen and sulfur-containing derivatives of polymers of unsaturated aldehydes which are obtained by mixing and reacting a high molecular weight insoluble polymer of an ethylenically unsaturated aldehyde, such as, for example, a polyacrolein, with an ammonium salt of the group consisting of ammonium sulfite, ammonium bisulfite, trihydrocarbyl ammonium sulfite and trihydrocarbyl ammonium bisulfite, preferably in an aqueous medium.

As a special embodiment, the invention provides new water-soluble nitrogen and sulfur-containing polymeric derivatives having a plurality of structural units as

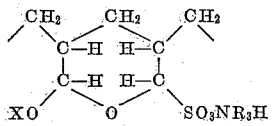

wherein X is hydrogen, $NH_4$ or $R_3NH$ and R is hydrogen or an organic radical such as a hydrocarbon radical.

As a further special embodiment, the invention provides a process for using the above-described water-soluble nitrogen and sulfur-containing polymeric derivatives for the treatment of fibrous material and particularly for the treatment of paper to improve their properties, such as strength, flexibility and crease resistance.

Cellulosic paper when wet loses its strength and is easily torn. In order to overcome this defect, it has become common practice to treat paper with a nitrogen-containing resin such as urea or melamine-formaldehyde that can be subsequently cured to form an insoluble resin. While this method has imparted some improvement in wet strength, it leaves much to be desired in commercial applications. The wet strength provided by this method, for example, is not as high as required for many uses. In addition, the improvement in wet strength is only temporary and is lost after exposure to water. This has been found to be due in part to the fact that the cured nitrogen-containing resin is easily hydrolyzed, particularly in the presence of the acid curing agents remaining in the resin. Furthermore, the paper treated by the above-method does not have the desired dimensional stability, fold endurance and tear strength required for many commercial applications. In some cases, attempts have been made to improve these properties by adding additional amounts of the nitrogen resin, but this only makes the paper lose its customary feel, appearance and flexibility.

It is an object of the invention to provide a new class of polymeric materials. It is a further object to provide a new class of water-soluble nitrogen- and sulfur-containing polymeric materials and a method for their preparation. It is a further object to provide a new class of water-soluble nitrogen and sulfur-containing polymeric derivatives of aldehyde polymers which are particularly useful and valuable in industry. It is a further object to provide new water-soluble polymeric derivatives which may be used for the treatment of fibrous material. It is a further object to provide new water-soluble derivatives of unsaturated aldehyde polymers which may be used for the treatment of paper. It is a further object to provide a method for treating fibrous materials to improve their strength, flexibility and crease resistance. It is a further object to provide a method for producing paper having improved dry and wet strengths. Other objects and advantages of the invention will be apparent from the following detailed description thereof.

It has now been discovered that these and other objects may be accomplished by the new products of the invention comprising water-soluble nitrogen and sulfur-containing derivatives of polymers of unsaturated aldehydes, such as, for example, polyacroleins, which are obtained by mixing and reacting a high molecular weight insoluble polymer of the unsaturated aldehyde with an ammonium salt of the group consisting of ammonium sulfite, ammonium bisulfite, trihydrocarbyl ammonium sulfite and trihydrocarbyl ammonium bisulfite, preferably in an aqueous medium. It has been found that these special water-soluble nitrogen and sulfur-containing derivatives of the polymers of unsaturated aldehydes have unexpected properties, particularly when applied to fibrous materials, such as paper, textiles, leather and the like. When applied to paper, they act as sizing and/or wet and dry strength agents to improved properties, such as strength, flexibility fold endurance and the like. This improvement is accomplished without the use of special curing agents.

It was quite unexpected to find that products of this type could be obtained from the insoluble polymers of the unsaturated aldehydes. Such polymers, for example, have been found to be relatively insoluble in most materials and it has been very difficult to find materials which would dissolve or react therewith. It was particularly surprising to find that the ammonium salts reacted with such materials to give water-soluble derivatives because the related alkali metal sulfites, such as sodium sulfite, did not dissolve the insoluble acrolein polymers.

The alpha,beta-ethylenically-unsaturated aldehydes used in making the basic polymers comprise those aldehydes having an ethylenic group in an alpha,beta-position relative to the aldehyde group, such as, for example, acrolein, alpha and beta-substituted acroleins such as alpha-ethylacrolein, alpha-isobutylacrolein, alpha-chloroacrolein, beta-phenylacrolein, alpha-decylacrolein, alpha-cyclohexylacrolein, alpha-methylacrolein and the like. Preferred aldehydes to be employed in making the polymers include the alpha,beta-monoethylenically unsaturated aldehydes containing from 3 to 12 carbon atoms, and especially acrolein and the alpha and beta-substituted acroleins wherein the substituent on the alpha and/or beta positions is an alkyl, cycloalkyl or aryl group containing no more than 8 carbon atoms. 2-alkenals containing up to 8 carbon atoms come under special consideration.

The polymers include not only the homopolymers of the unsaturated aldehydes, but also the copolymers of the aldehydes with other ethylenically unsaturated monomers such as those possessing at least one $>C=C<$ group, and preferably those containing a $CH_2=C<$ group, such as, for example, styrene, alpha-methylstyrene, butadiene, isoprene, methylpentadiene, ethylene, propylene, isobutylene, isooctene, vinyl acetate, vinyl propionate, vinylpyridine, vinylpyrolidone, vinylnaphthalene, vinylcyclohexene, acrylonitrile, methacrylonitrile, vinyl chloride, vinylidene chloride, acrylate esters as methyl methacrylate, ethyl acrylate, ethyl methacrylate, butyl acrylate and allylic compounds such as allyl acetate, allyl alcohol, allyl butyrate, allyl benzoate, allyl cyclohexanecarboxylate, allylamine and the like. These additional monomers are preferably employed in minor amounts, and preferably in amounts varying from about .5% to 40%, and preferably 1% to 35%, by weight of the mixture of monomers.

The polymers of the above-described unsaturated aldehydes to be employed in preparing the new derivatives of the present invention are those obtained by addition polymerization through the double bond and those having a molecular weight ranging from about 40,000 to 2,000,000 and higher, said molecular weights being determined by the light scattering technique. The molecular weight range may also be indicated by intrinsic viscosity values as these are usually more easily determined. Preferred polymers are those having intrinsic viscosities (as determined on the solubilized measurements at 25° C. solubilized form of the polymer) of at least 0.9 and preferably 0.9 to 5.0. These values are determined by the conventional technique of polyelectrolyte viscosity measurements at 25° C.

The preferred polymers are those possessing a high theoretical aldehyde function, i.e., when the polymer is subjected to conventional tests for the presence of aldehyde groups (e.g., addition of hydroxylamine hydrochloride and titrated liberated $H_2O$ with Karl Fischer reagent) the results show a high percent, e.g., above 90%, and preferably 95% to 99%, of the theoretical aldehyde groups present as such or in the hydrated form. Many of the preferred polymers have the aldehyde groups present in the hydrated form as

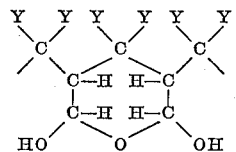

and some

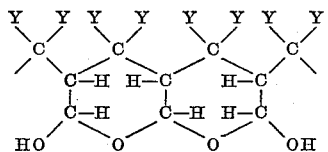

wherein Y is hydrogen or lower alkyl.

Many of the preferred polymers are also insoluble in water and insoluble in conventional solvents, such as benzene, toluene, acetone, and the like. They may be used as such or they may be converted to the soluble form as by treatment with various materials, such as sulfur dioxide, sodium sulfite, mercaptans, alcohols and the like.

The above-described polymers may be prepared by a variety of different methods. They may be prepared, for example, by heating the unsaturated aldehyde with free radical catalysts, such as peroxides as benzoyl peroxide, tertiary butyl hydroperoxide, tertiary butyl perbenzoate, tertiary butyl peracetate and the like, in bulk, emulsion or suspension systems.

High molecular weight polymers and their soluble forms which give outstanding results in the process of the invention are described and claimed in copending patent application Serial No. 859,156, filed December 14, 1959, now U.S. Patent No. 3,079,357, and copending application Serial No. 859,154, filed December 14, 1959, and so much of the disclosure of these two applications relative to these polymers and derivatives and their preparation is incorporated into this application.

The preparation of some of the unsaturated aldehyde polymers by the above-noted method is illustrated below.

POLYMER A 100 parts of acrolein was added to 400 parts of water, to this mixture was added .271 part of potassium persulfate, .203 part of ferrous chloride tetrahydrate, 1 part of nonyl-phenol-ethylene oxide adducts as anti-coalescent agent and .4 part of disodium salt of ethylene diamine tetracetic acid. The resulting mixture was stirred for 24 hours at room temperature under atmosphere of nitrogen. During this period a white solid precipitated to the bottom. The mixture was filtered and the solid precipitate was washed with water and dried to yield 47 parts of polymer. The resulting product was a white powder polymer having an intrinsic viscosity (as determined on the sulfur dioxide solubilized form) of 1.8 dl./g.

POLYMER B 100 parts of acrolein was added to 300 parts of water and to this mixture was added .272 part potassium persulfate, .203 part of ferrous chloride tetrahydrate and .4 part of disodium salt of ethylene diamine tetracetic acid. The resulting mixture was stirred for 25 hours at 0° C. under an atmosphere of nitrogen. During that period a white solid precipitated to the bottom. The mixture was filtered and the solid precipitate was washed with water and dried to yield 27 parts polymer. The resulting product was a white powder polymer having an intrinsic viscosity (as determined on the sulfur dioxide solubilized form) of 2.3 dl./g.

POLYMER C 1000 parts of acrolein was added to 2000 parts of water and to this mixture was added 2.73 parts of potassium persulfate, 2.02 parts ferrous chloride tetrahydrate, 10 parts of nonylphenol-ethylene oxide condensate and 4 parts of disodium salt of ethylene diamine tetracetic acid. This mixture was stirred for 42 hours at room temperature (20° C.) under nitrogen. The resulting product was a white powder polymer having an intrinsic viscosity of 1.5.

POLYMER D 100 parts of acrolein was added to 325 parts of water and to this mixture was added 2.70 parts of potassium persulfate, 2.00 parts of ferrous chloride tetrahydrate and 4 parts of disodium salt of ethylene diamine tetraacetic acid. This mixture was kept at room temperature for 6 hours with stirring and under an atmosphere of nitrogen. The resulting 46 parts of product was a white powder polyacrolein having an intrinsic viscosity of 1.02 dl./g.

POLYMER E

The procedure shown above with Polymer C is repeated with the exception that the nonylphenol-ethylene oxide adduct is replaced by a straight ethylene oxide polymer. Resulting product is a finely divided polyacrolein having an I.V. of 1.5.

The new nitrogen and sulfur-containing polymeric derivatives of the present invention are obtained by mixing and reacting any one or more of the above-described aldehyde polymers with an ammonium salt as ammonium sulfite, ammonium bisulfite, trihydrocarbyl sulfite, and trihydrocarbyl bisulfite. Examples of the trihydrocarbyl sulfite and bisulfite include, among others, triethyl ammonium sulfite, triphenyl ammonium sulfite, trioctyl ammonium sulfite, tricyclohexyl ammonium sulfite, triethyl ammonium bisulfite, trinonyl ammonium sulfite, trihexyl ammonium bisulfite, diethyl methyl ammonium sulfite, triallyl ammonium sulfite and triisobutyl ammonium sulfite. Preferred trihydrocarbyl sulfites and bisulfites to be employed include those wherein the hydrocarbyl radicals contain no more than 18 carbon atoms each, and still more preferably, the trialkyl, triaryl, tricycloalkyl and trialkaryl ammonium sulfites and bisulfites each containing no more than 20 carbon atoms.

The amount of the ammonium salt to be used in the reaction will vary over a wide range. In general, prefer to employ at least .5 times the stoichiometric amount, i.e., .5 times the amount of salt needed to furnish an ammonium radical or substituted radical for each aldehyde group to be reacted. Preferred amounts vary from about .9 to 1.5 times the stoichiometric amount. The exact amount to be used for each case will depend on the degree of reaction desired. Preferred products are those wherein up to 85% of the aldehyde groups have been converted to the sulfur and nitrogen-containing radical. Particularly preferred products are those having from 20% to 60% of the aldehyde groups converted.

The reaction may be accomplished in any suitable liquid medium, such as, for example, water, aqueous solutions of alcohols and the like, inert hydrocarbon, such as xylene, benzene, oxygen-containing solvents, such as tetrahydrofuran, esters and the like. Best results, however, are obtained when the reaction is conducted in an aqueous medium and that is the preferred medium to be employed. When water is employed, the new products can be retained therein without further purification or separation for most of the hereinafter applications.

Dilute solutions or suspensions of the polymer are desired. Preferred concentrations of the polymer will vary from about 0.1% to 40%, and still more preferably from .1% to 20%.

The temperature employed in the reaction will vary over a wide range depending upon the desired rate of reaction. The reaction takes place readily at room temperature (e.g., about 20° C.) but higher rates of reaction may be obtained by using higher temperatures say up to about 100° C. Preferred temperatures range from about 15° C. to 100° C.

Atmospheric, subatmospheric or superatmospheric pressures may be utilized as desired.

The new nitrogen and sulfur-containing polymeric derivatives may be recovered from the reaction mixture by any suitable means. They may be recovered, for example, by evaporation, distillation, crystallization extraction and the like. In the event the polymer derivative is formed in an aqueous medium, they may be retained therein for most applications.

The new nitrogen and sulfur-containing polymeric derivatives of the present invention are solid products. The derivative obtained by the use of the ammonium bisulfite is slightly yellow, but the other products will, in most cases, be substantially white solids. The new polymeric derivatives are solutions in water and have some solubility in other media, such as alcohols, tetrahydrofuran, dimethyl sulfoxide, and the like. The molecular weights of the polymeric derivatives will be substantially the same as the polymers from which they are prepared as there is very little if any degradation taking place during the above treatment. The new products will, in general, contain about 1% to 16% nitrogen and from 12% to 24% sulfur.

The products of the invention possess a plurality of structural units as

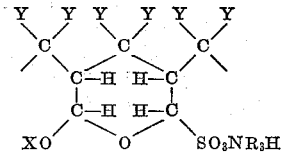

wherein X is hydrogen or lower alkyl, R is hydrogen or an organic radical such as a hydrocarbon radical and Y is as described above.

As all aldehyde groups or hydrated aldehyde groups are not converted, the products will also possess a plurality of structural units as

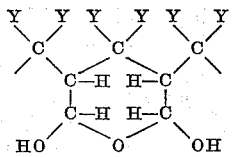

The amount of each unit will depend on the conversion of the aldehyde or hydrated aldehyde groups. Preferably 0.5 to 60% of the aldehyde or hydrated aldehyde groups are converted, and still more preferably .5% to 35% leaving the remaining aldehyde or hydrated aldehyde as noted above.

The new water-soluble derivatives of the present invention may be used for a great many important applications. As direct water solutions, they may be used in the formation of films, threads, treatment of animal skins and the like, and as coatings for various materials as woods, metal and the like.

As noted above, the water-soluble derivatives are particularly useful for the treatment of fibrous materials and especially cellulosic materials as textile fabrics as cotton-containing fabrics and paper and paper products. When used for the treatment of paper, the new derivatives add strength, flexibility and improved fold endurance.

The above-described derivatives are preferably used in water solutions when applied to the paper. These aqueous solutions may be prepared by merely adding water to the water solution in which the derivatives are formed or by adding the crystalline solid directly to the desired amount of water. The concentrations of the solutions preferably vary from about 0.1% to 5% aqueous solutions. Particularly preferred concentrations vary from about .5% to 2.5% by weight.

The water solutions used in the treatment of the paper may be basic, neutral or acidic, but it is generally preferred to employ basic solutions. Particularly superior results are obtained, both in the dipping process and in the wet end treatment by adding a polyvalent metal salt, such as, for example, aluminum sulfate, zinc sulfate and the like to the bath containing the new derivatives. When this technique is employed, much higher wet strength retention values are obtained as compared to those obtained by using the usual procedure without the added salts.

Emulsifying agents, water-dispersible binding colloids, plasticizers, anti-oxidants, dyes, fillers, etc. may also be included in the aqueous system, but are not essential to obtaining the results set out above.

As indicated above, the aqueous systems containing the new derivatives may be applied to the finished paper or at any stage during the wet end preparation, by wet end is meant any stage from the time the pulp is added to water to the time when the pulp makes up more than the water. It is preferred to employ the new derivatives directly on the finished paper or at the beater stage.

If one adds the new derivative solution during the beater stage, the beater operations may be any of those now used for this purpose. One merely needs to pour or otherwise add the solubilized polymer solution directly to the aqueous suspension of pulp either all at once or intermittently over a short period of time. The solid polymer derivatives may also be added directly at this stage.

If the aqueous system is to be applied to the finished paper, it may be added by spraying, by rollers, by dipping or by running the paper through a conventional-type padding apparatus. Amount of pick-up will vary, but in most cases vary from about 50% to 100% based on the weight of the paper.

After the aqueous system has been applied to the paper as indicated above, the treated product is then subsequently dried to effect the cure. The drying may be accomplished by merely rolling or squeezing off the excess solution and then setting out the paper in the air to dry, or by use of forced air. Temperatures used in the drying may vary from about room temperature, e.g., about 20° C. to 100° C. The period of drying will depend largely on the amount of pick-up and concentration of the polymer solution. In most instances, drying periods of from about 1 to 30 minutes should be sufficient.

Any type of paper may be treated according to the process of the invention. Examples of such paper include, for example, those prepared from wood, cotton, linen, hemp, jute, mulberry, straw, bamboo and can fibers or mixtures thereof, by any of the known processes, such as the sulfate process, soda process, sulfite process. The paper may be colored or white and may be further treated for special applications.

The paper treated according to the process of the invention may be used for a variety of applications such as facial tissue, hand towels, maps, filing cards, construction paper, wrapping paper, containers and the like. Because of its resistance to hydrolysis and relative non-toxic nature, the paper is particularly suited for use in preparing wrapper or containers for food.

To illustrate the manner in which the invention may be carried out, the following examples are given. It is to be understood, however, that the examples are for the purpose of illustration and the invention is not to be regarded as limited to any of the specific materials or conditions recited therein.

*Example I*

This example illustrates the preparation and some of the properties of a water-soluble derivative of polyacrolein and ammonium sulfite, and the use of this material for the treatment of paper.

10 parts of a water-insoluble polyacrolein having an intrinsic viscosity of 1.0 dl./g. and prepared as in Polymer C above was suspended in water to form a 12% slurry. 20 parts of ammonium sulfite was added thereto and the mixture stirred at room temperature. In about 10 minutes, the polymer had gone into solution. Evaporation of the solution gave a yellow-red solid which was identified as an ammonium sulfite derivative of polyacrolein having plurality of structural units as

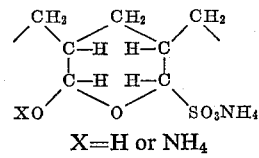

X=H or NH₄ the polymer had substantially the same molecular weight as the initial polyacrolein.

A 1%, 2% and 3% water solution of the above-described crystalline solid was prepared by adding the salt to the necessary amount of water. Sheets of bleached sulfite paper and sheets of unbleached kraft paper were then dip impregnated with this solution by passing the paper into and through the solution so as to effect a 100% wet pick-up. The sheets were then pressed out on dry paper and allowed to dry at room temperature.

The resulting sheets had the appearance, feel and flexibility of the untreated paper, but demonstrated surprising improvement in fold endurance, dimensional stability, resistance to hydrolysis and improvement in dry and wet strength.

*Example II*

This example illustrates the preparation and some of the properties of a water-soluble derivative of polyacrolein and ammonium bisulfite, and the use of this material for treatment of paper.

10 parts of a water-insoluble polyacrolein having an intrinsic viscosity of 1.0 dl./g. and prepared as in Polymer A above was suspended in water to form a 12% slurry. 16 parts of ammonium bisulfite was added thereto and the mixture stirred at room temperature. In about 210 minutes, the polymer had gone into solution. Evaporation of the solution gave a yellow solid which was identified as an ammonium bisulfite derivative of polyacrolein having a molecular weight of the original polymer.

A 1%, 2% and 3% water solution of the above-described crystalline solid was prepared by adding the salt to the necessary amount of water. Sheets of bleached sulfite paper and sheets of unbleached kraft paper were then dip impregnated with this solution by passing the paper into and through the solution so as to effect a 100% wet pick-up. The sheets were then pressed out on dry paper and allowed to dry at room temperature.

The resulting sheets had the appearance, feel and flexibility of the untreated paper, but demonstrated surprising improvement in fold endurance, dimensional stability, resistance to hydrolysis and improvement in dry and wet strength.

The wet and dry burst strength of the paper treated with the 1% solution are shown in the table below in comparison to an untreated paper:

| Paper | Dry | Wet |
|---|---|---|
| Bleached sulfite | 25 | 10 |
| Kraft | >100 | 19 |
| Kraft control | 78 | 3 |

*Example III*

10 parts of a water-insoluble polyacrolein having an intrinsic viscosity of 10 dl./g. and prepared as in Polymer D above was suspended in water so as to form a 4% slurry. 40 parts of triethyl ammonium sulfite was added and the mixture stirred at room temperature. In several days, the polymer had gone into solution. Evaporation of the solution gave a colorless water soluble solid identified as the triethyl ammonium sulfite derivative of polyacrolein.

A 1%, 2% and 3% water solution of the above-described crystalline solid was prepared by adding the necessary amount of the salt to water. Sheets of bleached sulfite paper and kraft paper were then passed into and through the water solution so as to effect a 100% wet pick-up. The sheets were pressed on dry paper and then allowed to dry at room temperature.

The resulting sheets had the appearance, feel and flexibility of the untreated paper, but demonstrated surprising improvement in fold endurance, dimensional stability, resistance to hydrolysis and improvement in wet strength. The burst strengths are shown in the table below:

| Paper | Wet | Dry |
|---|---|---|
| Kraft | 20 | 94 |
| Bleached sulfite | 8 | 20 |
| Kraft control | 3 | 78 |

*Example IV*

This example illustrates the preparation of a water-soluble polyacrolein derivative using triethyl ammonium bisulfite.

10 parts of a water-insoluble polyacrolein having an intrinsic viscosity of 1.0 dl./g. and prepared as in Polymer A above was suspended in water so as to form a 4% slurry. 26 parts of ammonium triethyl bisulfite are added thereto and the mixture stirred at room temperature. In several hours, the polymer had gone into solution. Evaporation of the solution gave a colorless, water soluble solid which was identified as the ammonium triethyl sulfonate derivative of polyacrolein having the following structural units

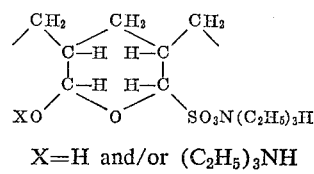

X=H and/or (C₂H₅)₃NH

A 1%, 2% and 3% water solution of the above-described crystalline solid was prepared by adding the necessary amount of the salt to water. Sheets of bleached sulfite were then passed into and through the water solution so as to effect a 100% wet pick-up. The sheets were pressed out on dry paper and then allowed to dry at room temperature.

The resulting sheets had the appearance, feel and flexibility of the untreated paper, but demonstrated surprising improvement in fold endurance, dimensional stability, resistance to hydrolysis and improvement in wet strength.

*Example V*

Examples I and IV are repeated with the exception that the polyacrolein is replaced by a polyacrolein having an I.V. of 1.8 and a polyacrolein having an I.V. of 2.0. Related results are obtained.

I claim as my invention:

1. A water-soluble nitrogen and sulfur-containing high molecular weight polymeric product having a plurality of structural units

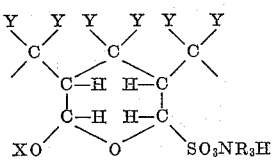

wherein Y is a member of the group consisting of hydrogen and lower alkyl groups, X is a member of the group consisting of hydrogen and $R_3NH$ radicals and R is a member of the group consisting of hydrogen and hydrocarbon radicals, which polymeric product has an intrinsic viscosity of at least 0.9 dl./g.

2. A water-soluble nitrogen and sulfur-containing high molecular weight polymer having a plurality of structural units

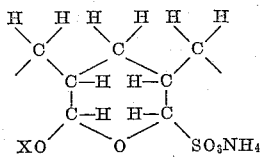

wherein X is a member of the group consisting of hydrogen and $NH_4$, said polymer having an intrinsic viscosity of at least 0.9 dl./g.

3. A water-soluble nitrogen and sulfur-containing high molecular weight polymer having a plurality of structural units

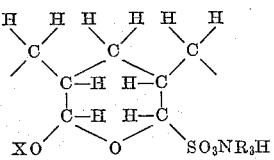

wherein X is a member of the group consisting of hydrogen and $NR_3H$, and R is an alkyl radical, said poymer having an intrinsic viscosity of at least 0.9 dl./g.

4. A water-soluble nitrogen and sulfur-containing high molecular weight polymeric product having a plurality of structural units

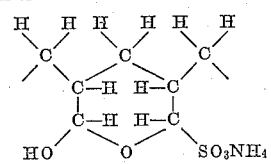

and an intrinsic viscosity of at least 0.9 dl./g.

5. A water-soluble nitrogen and sulfur-containing high molecular weight polymeric product having a plurality of structural units

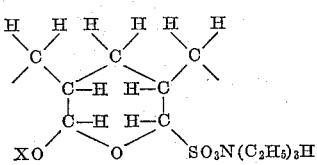

wherein X is a member of the group consisting of hydrogen and $N(C_2H_5)_3H$ and the polymer has an intrinsic viscosity of at least 0.9 dl./g.

6. A polymer product as defined in claim 2 wherein the nitrogen and sulfur-containing polymer has an intrinsic viscosity between 0.9 dl./g. and 4.0 dl./g.

7. A water-soluble nitrogen and sulfur-containing polymer having a plurality of structural units as

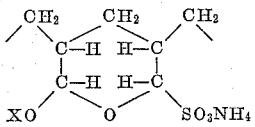

wherein X is a member of the group consisting of hydrogen and $NH_4$ radical, and a plurality of units of

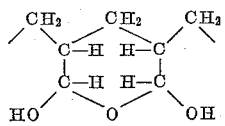

which polymer has an intrinsic viscosity of at least 0.9 dl./g.

8. A process for preparing polymeric sulfur and nitrogen-containing derivatives of polyacrolein having an intrinsic viscosity above about 0.9 dl./g. which comprises mixing and reacting the polyacrolein with an ammonium salt of the group consisting of ammonium sulfite, ammonium bisulfite, compounds of the formula $$[(R)_3NH]_2SO_3$$

wherein R is a hydrocarbon radical and compounds of the formula $(R)_3NHHSO_3$ wherein R is a hydrocarbon radical.

9. A process as in claim 8 wherein the polyacrolein has an intrinsic viscosity between 0.9 dl./g. and 4.0 dl./g.

10. A process as in claim 8 wherein the reaction is conducted in an aqueous medium.

11. A process as in claim 8 wherein the reaction is conducted at a temperature between 15° C. and 100° C.

12. A process as in claim 8 wherein the ammonium salt is ammonium sulfite.

13. A process as in claim 8 wherein the ammonium salt is triethyl ammonium sulfite.

14. A composition for treating paper to improve properties thereof comprising an aqueous solution of the polymeric product defined in claim 1.

15. A composition for treating paper comprising a water solution of the polymeric product defined in claim 2.

16. A process for treating paper to improve its properties which comprises padding the paper with an aqueous medium containing the water-soluble polymeric product defined in claim 1.

17. A process for preparing polymeric sulfur and nitrogen-containing derivatives of an alpha, beta ethylenically unsaturated aldehyde polymer which comprises mixing and reacting in an aqueous medium and at a temperature between 15° C. and 100° C. an addition polymer of the alpha, beta ethylenically unsaturated aldehyde having an intrinsic viscosity of at least 0.9 dl./g., with from 0.5 to 1.5 stoichiometric equivalents of an ammonium salt of the group consisting of ammonium sulfite, ammonium bisulfite, compounds of the formula $[(R)_3NH]_2SO_3$ wherein R is a hydrocarbon radical and compounds of the formula $(R)_3NHHSO_3$ wherein R is a hydrocarbon radical.

References Cited in the file of this patent

UNITED STATES PATENTS

| | | |
|---|---|---|
| 1,143,114 | Fuller | June 15, 1915 |
| 2,657,192 | Miller et al. | Oct. 27, 1953 |

FOREIGN PATENTS

| | | |
|---|---|---|
| 506,504 | Canada | Oct. 12, 1954 |
| 797,459 | Great Britain | July 2, 1958 |

OTHER REFERENCES

Schulz et al.: "Angewandte Chemie," volume 62, March 1950, pages 105, 112, 113.